United States Patent [19]
Pernick et al.

[11] Patent Number: 5,490,011
[45] Date of Patent: Feb. 6, 1996

[54] MODULAR ENCLOSURE ASSEMBLY

[75] Inventors: Benjamin J. Pernick, Forest Hills; Edward V. Sullivan, Huntington Station, both of N.Y.

[73] Assignee: Northrop Grumman Corporation, Los Angeles, Calif.

[21] Appl. No.: 255,934

[22] Filed: Jun. 7, 1994

[51] Int. Cl.$^6$ .............................. G02B 27/00; F16B 5/00; E04C 3/00
[52] U.S. Cl. .............................. 359/601; 211/41; 211/189
[58] Field of Search ............... 211/41, 189; 359/601, 359/603, 604, 605, 611; 362/325; 312/257.1, 263, 265.5

[56] References Cited

U.S. PATENT DOCUMENTS

| | | | |
|---|---|---|---|
| 4,268,897 | 5/1981 | Schierwagen et al. | 362/325 |
| 4,515,280 | 5/1985 | Sheu | 211/41 |
| 4,968,260 | 11/1990 | Ingalsbe | 439/676 |
| 5,012,937 | 5/1991 | Owens | 211/41 |
| 5,185,982 | 2/1993 | Hostetler | 211/189 |
| 5,425,648 | 6/1995 | Farham | 439/116 |

*Primary Examiner*—Paul M. Dzierzynski
*Assistant Examiner*—Mohammad Y. Sikder
*Attorney, Agent, or Firm*—Terry J. Anderson; Karl J. Hoch, Jr.

[57] ABSTRACT

Denticulated strips receive orthogonally disposed panels to form rectangular or cube enclosures of desired sizes. They are quickly assembled utilizing push pins. The panels are designed to have overlapping edges so that they minimize light/air leakage—making them particularly adaptable as optic baffles.

7 Claims, 5 Drawing Sheets

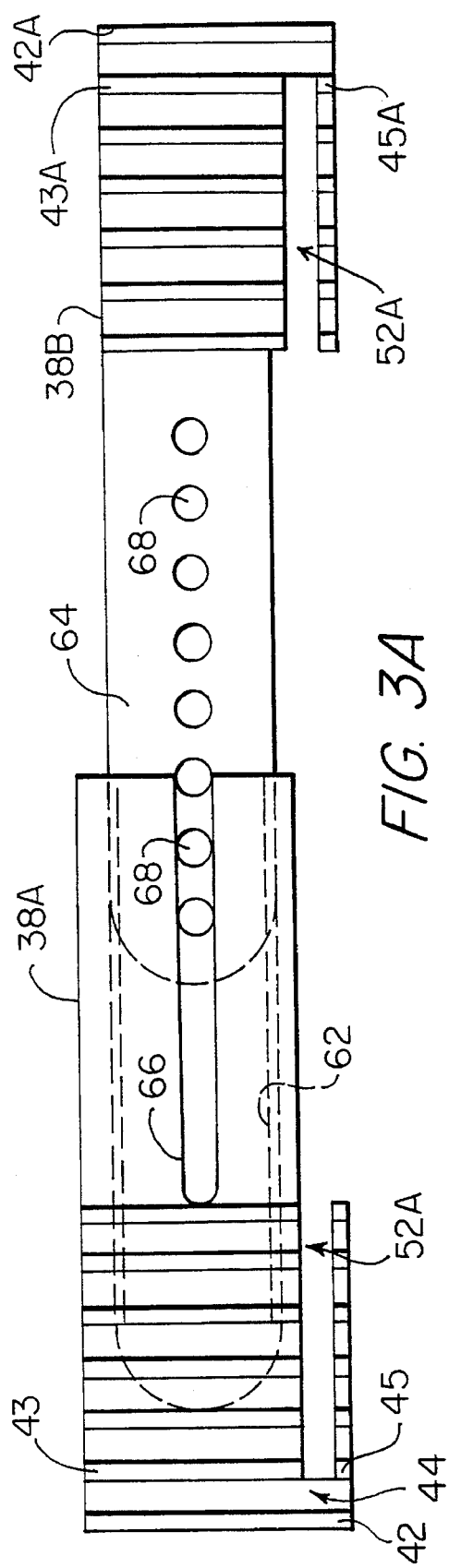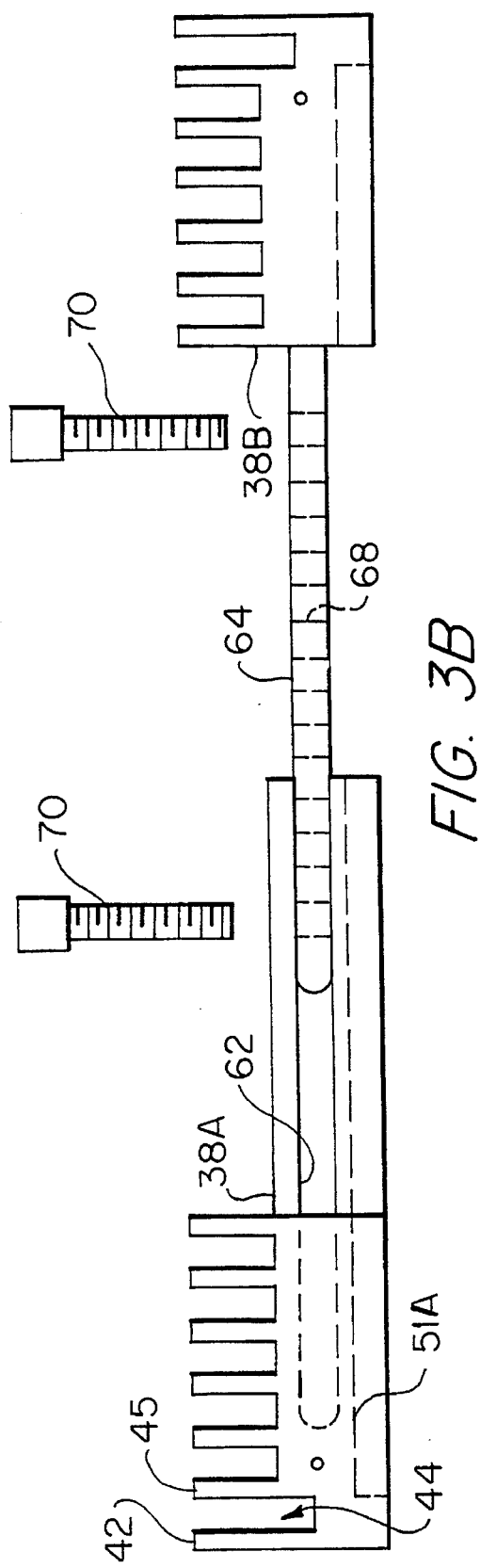

MODULAR ENCLOSURE ASSEMBLY

FIELD OF THE INVENTION

The present invention relates to modular enclosure assemblies, and more particularly to a toothlike or denticulated flange construction enabling enclosures to be quickly assembled, without special tools.

BACKGROUND OF THE INVENTION

In the construction of optic baffles to enclose a light beam path, fixed enclosures having inlet and outlet ports are frequently employed. Alternately, modules may be constructed utilizing fasteners for securing the various panels of a baffle together. This prior art approach is expensive and time consuming when baffles must be constructed with fasteners and tools.

BRIEF DESCRIPTION OF THE PRESENT INVENTION

The present assembly is a modular approach for constructing enclosures, such as rectangular boxes and cubes of different sizes. One particular example of such a structure is an optics enclosure with internal baffles to permit unobstructed light beam paths. The size may be easily configured on a customized basis. The panels of the enclosures may be made of light, rigid material, such as poster board or tinted acrylics and can be assembled without tools, fasteners, or adhesives. In certain applications panels made of heavier materials, such as plywood or metal sheets, could be used. The panels of the completed enclosure form overlapping edges to restrict light and air currents. However, inlet and outlet ports may be formed in the panels to provide access as required.

Denticulated strips are provided for securing the edges of the panels together, thereby forming enclosures. The various lightweight panels may be held in place in the strips by push pins or equivalent fasteners to enhance rigidity, which allow simple and rapid assembly, as well as disassembly.

These denticulated strips may be made from a metal (e.g., aluminum) or a variety of plastics, machined easily with a single cutter and sliced into as many individual strips as needed. For large quantities, injection molding may be practical. A completed three-dimensional structure may be used on any flat surface or on various types of optical bench guide rails which are prevalent in optics laboratories. They may also be directly bolted to a platform or optical bench having threaded holes or a portable test platform may be the support surface—where the assembly must be moved from place to place. As will be appreciated from the following discussion, arrangements for a wide margin of strip adjustments are allowed together with a wide choice of enclosure designs. Accordingly, the present invention is particularly well suited for optical enclosures and baffles.

The present invention is also particularly well suited as a means to alleviate optical disturbances due to air currents and unwanted light leaks.

The modular enclosure assembly of the present invention provides for a lightweight and durable structure which can be utilized for a variety of functions. The present invention provides a means for the construction of a variable size configuration in which the parts therefor are inexpensive to manufacture on a production basis. Specific uses for the present invention range from the construction of modular offices and temporary cover structures to containers for field experiments in which the wind and/or sun need be blocked. The modular enclosure assembly of the present invention is designed in such a manner and constructed from materials such that the apparatus is highly transportable and easy to assemble.

BRIEF DESCRIPTION OF THE FIGURES

The above-mentioned objects and advantages of the present invention will be more clearly understood when considered in conjunction with the accompanying drawings, in which:

FIG. 3A is a top plan view of a denticulated strip designed as a telescoping member;

FIG. 3B is a front elevational view of the strip shown in FIG. 3A;

DETAILED DESCRIPTION OF THE INVENTION

Figure 1:
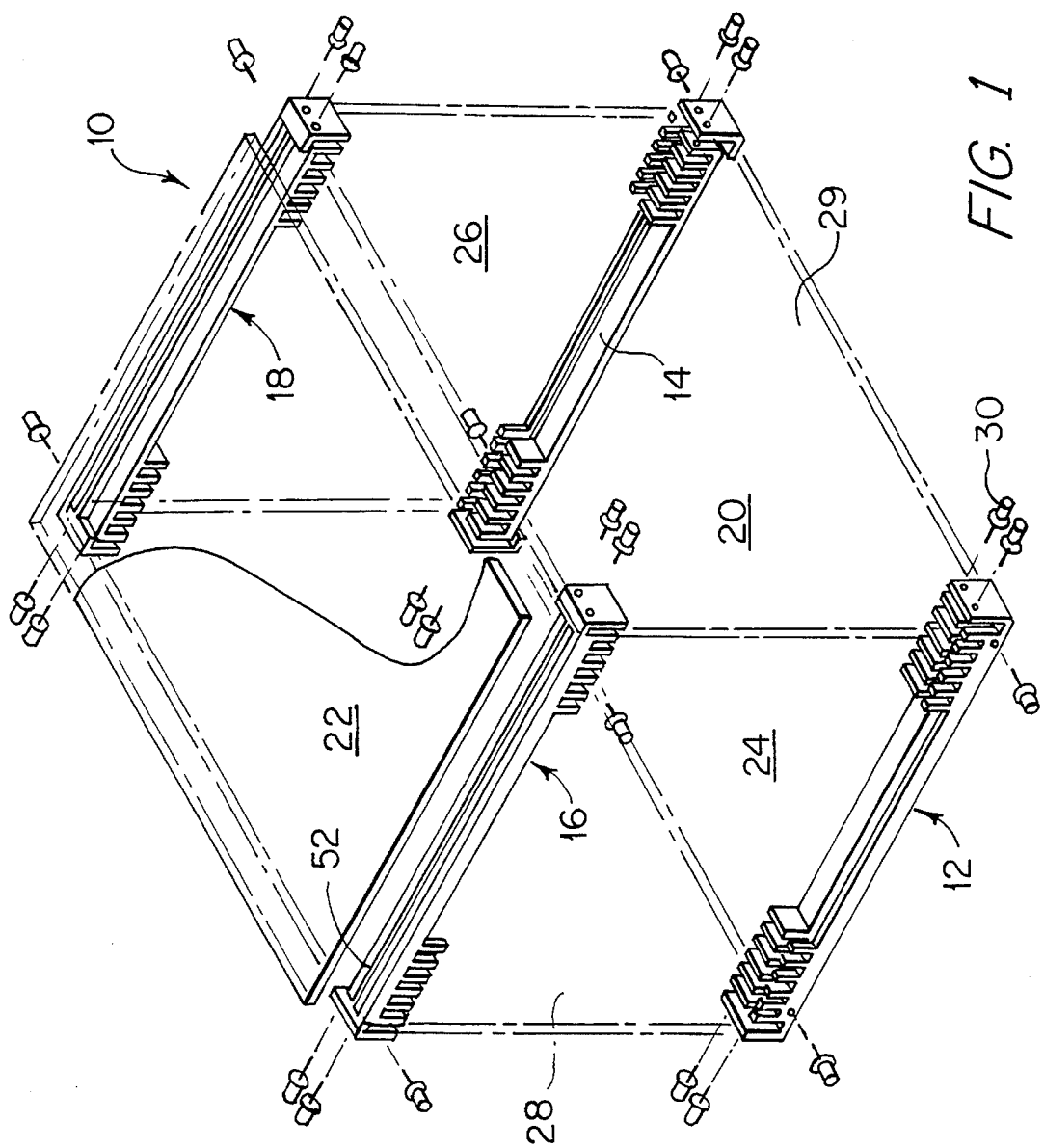
FIG. 1 is a perspective view illustrating the basic components of the present invention.

Referring to the figures and more particularly FIG. 1 thereof, the modular enclosure of the present invention is generally indicated by reference numeral 10 and is seen to include six panels 20, 22, 24, 26, 28, 29 held in place with four denticulated strips indicated by reference numerals 12, 14, 16, and 18. The strips receive the edge portions of top and bottom panels 20 and 22, side panels 28 and 29, and end panels 24 and 26. In some cases a bottom panel 20 may not be needed. Reference numeral 30 indicates push pins or fasteners which secure the various panels to the denticulated strips, which would be used in moving the setup from one location to another.

The use of the denticulated strips 12, 14, 16, and 18 in the parallel position shown in FIG. 1 permits a six-sided enclosure to be formed. Each strip may include an elongated recess such as 52 (FIG. 1) for receiving a top or bottom panel in flush mounted relationship with the strips.

Figure 2:
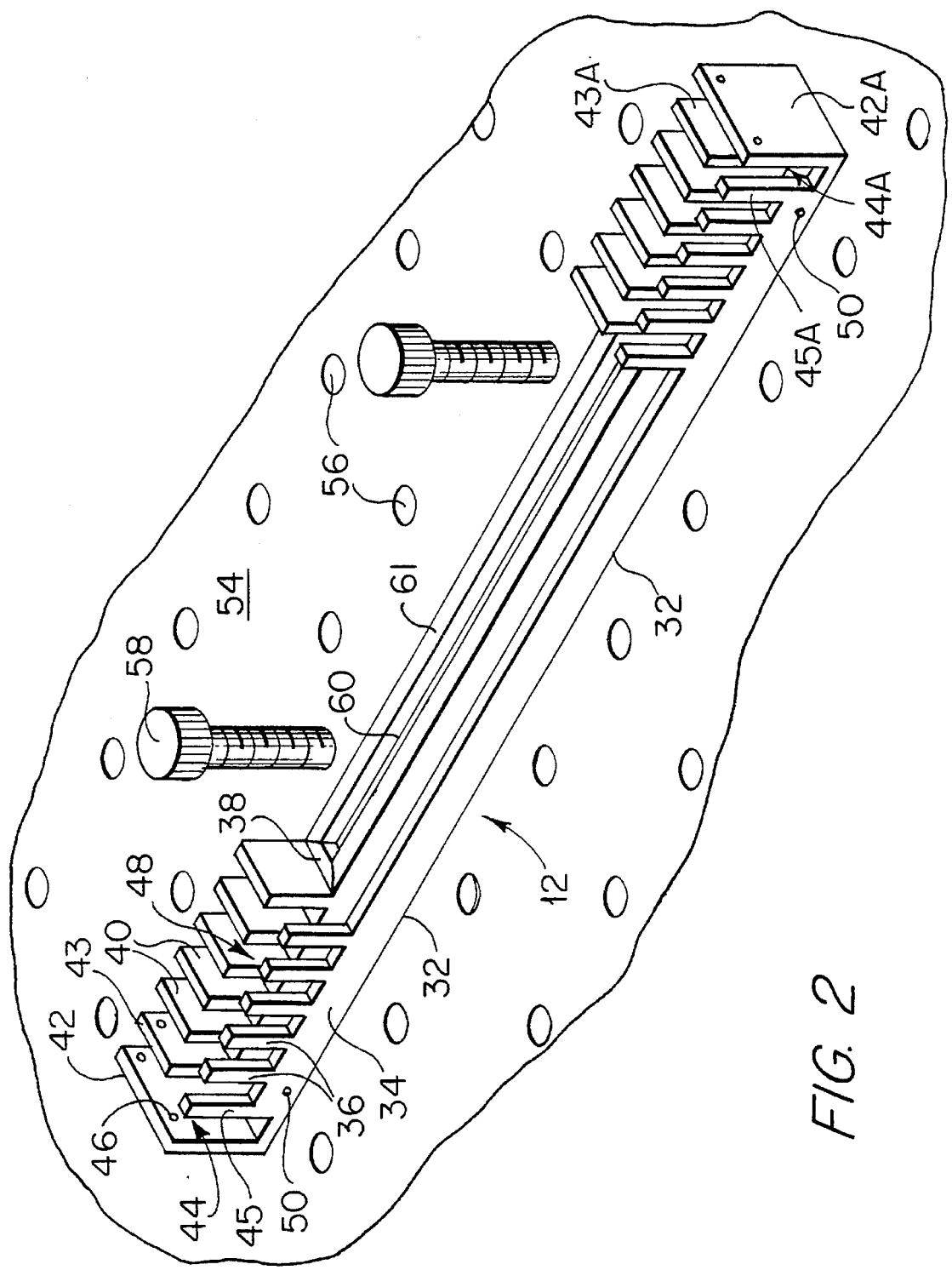
FIG. 2 is a perspective view illustrating the disposition of a particular denticulated strip on an apertured support surface.

FIG. 2 illustrates another design of the denticulated strips, such as strip 12, in greater detail. The base 32 of the strip supports an orthogonally oriented denticulated flange 34 having individual parallel separated projections 36. A second, preferably deeper, flange 38 arises perpendicularly from base 32 with a second set of denticulated projections 40 which are respectively aligned with the projections 36 of flange 34. The end projections 42 and 42A overlap the confronting, adjacent projections 43, 45. The channel 44 is created between projections 42 and adjacent projections 43, 45, thereby receiving the edge portion of a panel such as 24 (FIG. 1). Holes 46 are formed in the projection 42 and 43 for receiving the push pins or equivalent fasteners 30, shown in FIG. 1, which serve as fasteners for the assembly. Note, that the push pins 30 serve only as temporary securing devices.

The channel 48 (FIG. 2) extends longitudinally between the projections on flanges 34 and 38. This elongated channel permits the insertion of a bottom edge portion of a side panel 28, as shown in FIG. 1.

The end panel 24, as illustrated in FIG. 1, is received within channel 44A (FIG. 2). Holes 50 formed along flange 34 serve to receive push pins 30, as shown in FIG. 1—for temporarily securing end panel 24 to the denticulated strip 12.

In FIG. 2, strip 12 is seen to rest against a support surface 54, for example, an optical bread board, having threaded holes 56. Threaded fasteners 58 pass through a slot or openings 60 (view occluded) existing along a non-denticulated section 61 of strip 12.

FIGS. 3A and 3B illustrate a further embodiment of the present invention wherein the length of each denticulated strip may be easily altered due to the telescoping nature of each strip. In FIGS. 3A and 3B, a recess 62 is formed within the left end portion of a strip while the right end portion includes an elongated tabular section 64. A step-down section 38A of the left end portion includes a longitudinally extending slot 66 aligned with perpendicularly oriented openings 68 formed in the section 64. Threaded fasteners 70 are received within threaded openings 68 in the section 64 for adjusting the telescoping length of the strip. Accordingly, openings 68 should be tapped, i.e. threaded, for receiving the threaded fasteners 70. It should also be noted that the openings 68 need not be individual holes, but rather a continuous longitudinal opening for ease of adjustment. Foreshortened channel 52A separates the forward and rearward projections of the left-hand section and receives the lower edge of a panel. The channel 52A exists on the right-hand section of the strip for also receiving a correspondingly positioned portion of a panel. In FIG. 3B recess 51A receives a lower panel 20 (FIG. 1) in flush relationship as previously mentioned. The ability to clamp the two sections with threaded fasteners 70 and tapped openings 68 is of use when the surface on which the enclosure is to rest provides no threaded holes.

Figure 4:
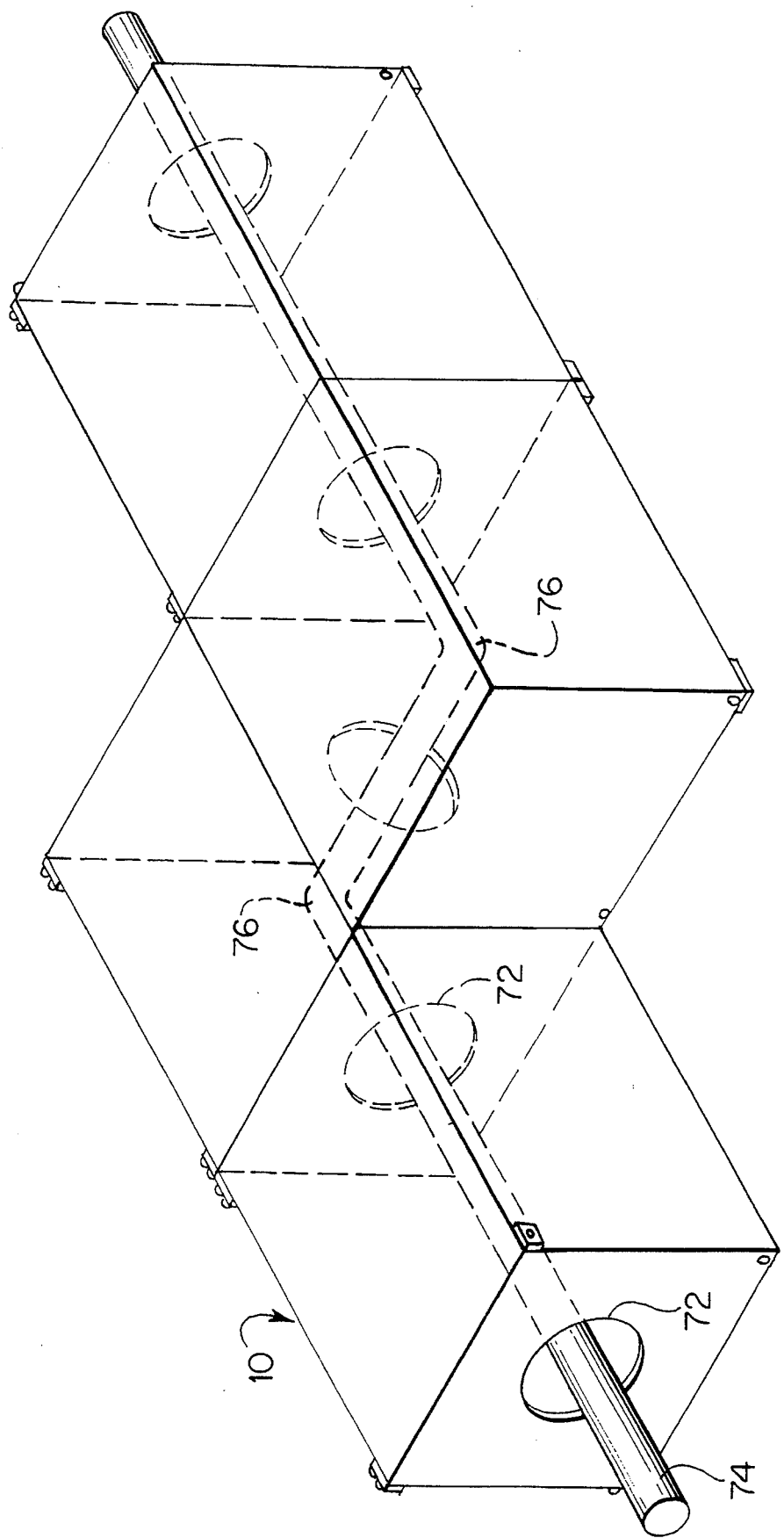
FIG. 4 is a perspective view illustrating a number of enclosures positioned in a preselected aligned configuration to form optic baffles for a light beam.

In FIG. 4 a number of enclosures are assembled and positioned adjacent to one another to form optic baffles having inlet and outlet ports 72 formed in certain panels to allow passage of a light beam 74 through the baffles as illustrated. The reflective surfaces or mirrors 76 would incorporate mirror or beam splitters in conventional fashion.

Figure 5:
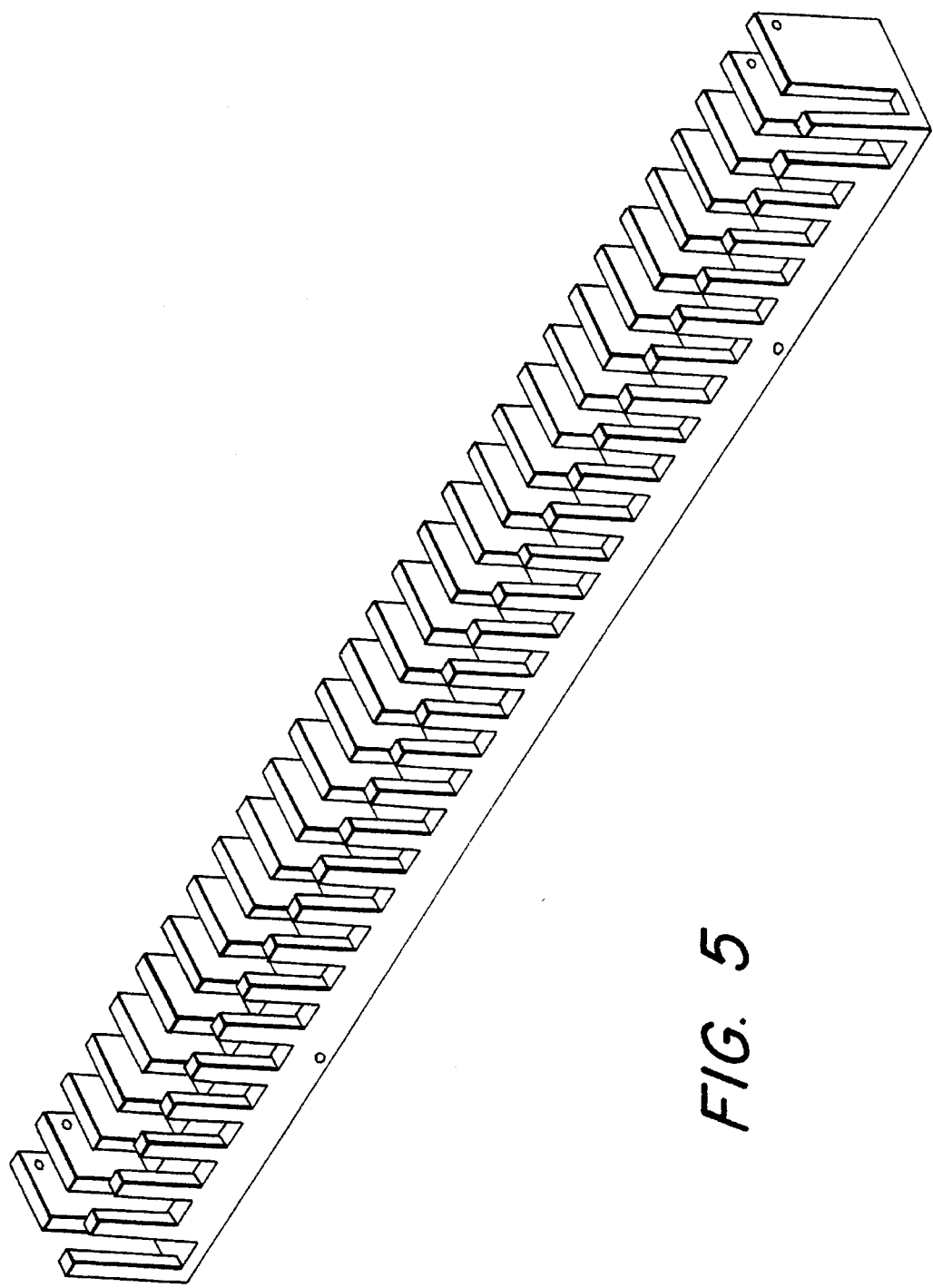
FIG. 5 is a perspective view illustrating a denticulated strip with projections along its entire length.

An alternate embodiment of present invention shown in FIG. 5 is envisioned to include denticulated strips having projections along the entire length thereof—to allow utilization flexibility if it is required. The completed assembly is intended to form overlapping edges to restrict light leaks and/or air currents within an enclosure so that it is very well adapted as an optical enclosure and baffle. The assembly itself may be designed to rest against a flat surface or may be adapted to rest against an optical guide rail assembly.

As will be appreciated from the above-described invention, a modular enclosure may be quickly assembled or disassembled—without the necessity of special tools. This not only affords an efficient means for constructing enclosures but the reusability offers an economical advantage.

Features of the invention are: (a) modular concept accommodates various enclosure sizes, shapes, and materials; (b) panels and strips can be custom made for a particular application; (c) alternately, a selection of standard size panels and strips can be created; (d) access openings can be included in panels for input and output ports and internal baffles; (e) overlapping edges restrict light leakage and air currents; and (f) provisions for fasteners can be included in the strip and panel designs if needed.

It should be understood that the invention is not limited to the exact details of construction shown and described herein for obvious modifications will occur to persons skilled in the art.

We claim:

1. A modular enclosure comprising:

a plurality of denticulated strips, each having at least dual rows of transversely aligned projections;

a first plurality of panels received within preselected first aligned channels between corresponding aligned projections;

each strip having an elongated second channel separating the rows of aligned projections;

a second plurality of panels received within respective elongated second channels—to complete a rectangular enclosure or cube enclosure;

the panels of the first and second plurality are positioned to have overlapping edges.

2. The enclosure set forth in claim 1 wherein the strips have holes formed therein for receiving fasteners which have passed through correspondingly positioned panels.

3. The enclosure set forth in claim 1 wherein each strip has upright flanges located at the ends of each strip for selectively receiving the first plurality of panels.

4. The enclosure set forth in claim 1 wherein openings are formed in a base of each strip to receive fasteners to secure an assembled enclosure to a support surface.

5. A modular enclosure comprising:

a plurality of denticulated strips, each having at least dual rows of transversely aligned projections;

a first plurality of panels received within preselected first aligned channels between corresponding aligned projections;

each strip having an elongated second channel separating the rows of aligned projections;

a second plurality of panels received within respective elongated second channels—to complete a rectangular enclosure or cube enclosure;

the panels of the first and second plurality are positioned to have overlapping edges;

each of the strips further including two telescoping sections for adjusting strip length; and openings formed in the sections for receiving fasteners therein which secure the sections together at a preselected strip length.

6. A modular optics baffle comprising:

a plurality of denticulated strips, each having at least dual rows of aligned projections;

a first plurality of panels received within preselected first aligned channels between corresponding aligned projections;

each strip having an elongated second channel separating the rows of aligned projections;

a second plurality of panels received within respective elongated second channels—to complete a parallelepiped;

the panels of the first and second plurality positioned to have overlapping edges; and apertures formed in preselected panels for allowing passage of a light beam therethrough.

7. A modular optics baffle comprising:

a plurality of denticulated strips, each having at least dual rows of aligned projections;

a first plurality of panels received within preselected first aligned channels between corresponding aligned projections;

each strip having an elongated second channel separating the rows of aligned projections;

a second plurality of panels received within respective elongated second channels—to complete a parallelepiped;

the panels of the first and second plurality positioned to have overlapping edges; and apertures formed in preselected panels for allowing passage of a light beam therethrough;

each strip having upright flanges located at the ends of each strip for selectively receiving the first plurality of panels.

* * * * *